US009762272B1

(12) United States Patent
Thirukannan et al.

(10) Patent No.: US 9,762,272 B1
(45) Date of Patent: Sep. 12, 2017

(54) METHOD AND APPARATUS FOR ADAPTIVE COVARIANCE ESTIMATION

(71) Applicant: MBIT WIRELESS, INC., Irvine, CA (US)

(72) Inventors: Karthik Thirukannan, Puducherry (IN); Keerthivasan Suresh, Chennai (IN); Krishnavelan Sivaraman, Puducherry (IN)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/206,443

(22) Filed: Jul. 11, 2016

(51) Int. Cl.
*H04B 1/00* (2006.01)
*H04B 1/10* (2006.01)
*H04L 27/26* (2006.01)
*H04W 84/04* (2009.01)

(52) U.S. Cl.
CPC .......... *H04B 1/1027* (2013.01); *H04L 27/26* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 7,991,059 B2* | 8/2011 | Hoejen-Soerensen | H04L 25/0216 375/260 |
| 9,344,303 B1* | 5/2016 | Moshavi | H04L 25/03968 |
| 2009/0016455 A1* | 1/2009 | Hoejen-Soerensen | H04L 25/0216 375/260 |
| 2009/0274204 A1* | 11/2009 | Chen | H04L 1/0027 375/228 |
| 2012/0182857 A1* | 7/2012 | Bertrand | H04J 13/0062 370/210 |
| 2014/0348258 A1* | 11/2014 | Walton | H04B 7/022 375/267 |
| 2015/0030092 A1* | 1/2015 | Krishnamurthy | H04B 7/0456 375/267 |
| 2015/0236882 A1* | 8/2015 | Bertrand | H04L 5/0048 370/329 |
| 2015/0263796 A1* | 9/2015 | Nam | H04B 7/0417 370/329 |
| 2015/0282190 A1* | 10/2015 | Jung | H04J 11/005 370/330 |

* cited by examiner

*Primary Examiner* — Fayyaz Alam
(74) *Attorney, Agent, or Firm* — Lerner, David, Littenberg, Krumholz & Mentlik, LLP

(57) ABSTRACT

MMSE-IRC receiver may be used to suppress inter-cell interference for improving the cell-edge user throughput in cellular wireless communication systems. But MMSE-IRC performance is limited by estimation errors, namely, channel estimation error and covariance matrix estimation error. It is important to have an accurate covariance matrix estimation scheme, so that maximum gain from MMSE-IRC receiver may be achieved. In order to have accurate estimation, covariance matrix may be averaged across channel bandwidth in frequency domain. A method and apparatus are disclosed that adaptively determine the averaging bandwidth employed for covariance matrix estimation based on the detected delay spread and SNR. Based on the present disclosure, the throughput performance of MMSE-IRC receiver may be improved by adaptively using suitable sub-band length in frequency domain averaging of covariance matrix estimation.

20 Claims, 18 Drawing Sheets

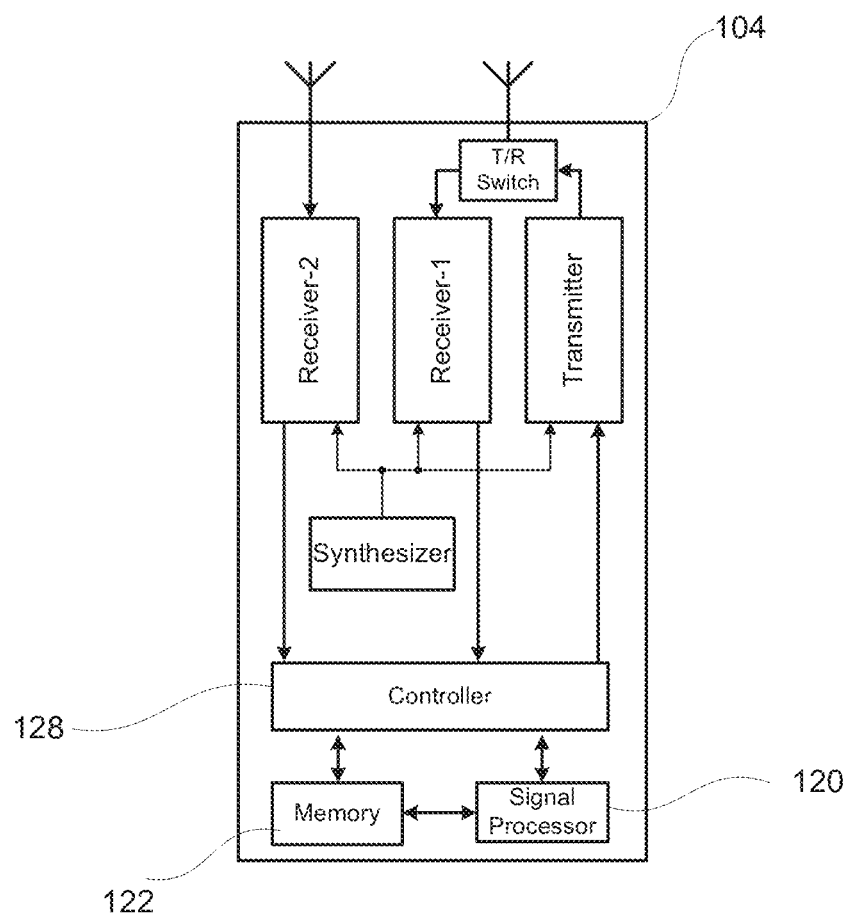

METHOD AND APPARATUS FOR ADAPTIVE COVARIANCE ESTIMATION

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred to as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing methods is Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is Time Division Duplexing (TDD). In TDD based wireless communication systems, the same exact frequency is used for communication in both DL and UL. In TDD wireless communication systems, the client terminals may be either receiving or transmitting but not both simultaneously. The use of the Radio Frequency (RF) channel for DL and UL may alternate on periodic basis. For example, in every 5 ms time duration, during the first half, the RF channel may be used for DL while the RF channel may be used for UL during the second half. In some communication systems the time duration for which the RF channel is used for DL and UL may be adjustable and may be changed dynamically.

Yet another commonly used duplexing method is Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

In many wireless communication systems, normally the communication between the base station and client terminals is organized into frames as shown in FIG. 3. The frame duration may be different for different communication systems and normally it may be in the order of milliseconds (ms). For a given communication system the frame duration may be fixed. In a TDD wireless communication system, a frame may be divided into a DL subframe and a UL subframe such that the communication from base station to the client terminal (DL) direction takes place during the DL subframe and the communication from client terminal to network (UL) direction takes place during UL subframe on the same RF channel.

Orthogonal Frequency Division Multiplexing (OFDM) systems typically use Cyclic Prefix (CP) to combat inter-symbol interference and to maintain the subcarriers orthogonal to each other under multipath fading propagation environment. The CP is a portion of the sample data that is copied from the tail part of an OFDM symbol to the beginning of the OFDM symbol as shown in FIG. 4. One or more OFDM symbols in sequence as shown in FIG. 4 are referred herein as OFDM signal.

Most wireless communication systems may employ some form of framing in the air interface. For example, 10 ms radio frames are used in the 3rd Generation Partnership Project (3GPP) Long Term Evolution (LTE) wireless communication system and each radio frame comprises 10 subframes as shown in FIG. 5. Each subframe in turn consists of two slots and each slot consists of 6 or 7 OFDM symbols depending on the type of CP used as shown in FIG. 5. In 3GPP LTE wireless communication system, two different CP lengths are used and they are referred to as Normal CP and Extended CP. In wireless communication systems, normally the specific air interface frame structure repeats itself over certain periodicity.

In cellular wireless communication systems, the same frequencies may be used at the same time by base stations in neighboring cells. Therefore, performance of cellular wireless communication systems in many cases is limited by interference from the neighboring cells. The interference may occur both in the downlink direction and in the uplink direction. In interference limited cellular wireless communication systems, mainly two types of interference may need to be taken into consideration namely intra-cell interference and inter-cell interference. In intra-cell interference, the source of interference is in the same cell. This could occur, for example, when multiple client terminals are scheduled to receive or transmit on the same frequency resources at the same time. The intra-cell interference may also occur due to leakage from transmission in adjacent channels within a cell. In inter-cell interference, the source of interference is one or more adjacent cells. It is primarily caused by the use of same frequency channel in neighbor cells.

In 3GPP LTE, the smallest unit of radio resource that can be allocated to a user for data transmission is called Resource Block (RB). An RB is a time-frequency radio resource that spans over a time slot of 0.5 ms in the time domain and 12 subcarriers of 15 kHz bandwidth each in frequency domain with a total RB bandwidth of 180 kHz. The RB pairs over two consecutive timeslots in time domain may be allocated to a client terminal for data transmission in a Transmission Time Interval (TTI) of 1 ms known as a subframe as illustrated in FIG. 5. Orthogonal Frequency Division Multiplexing Access (OFDMA) is used in 3GPP LTE where the subcarriers are mutually orthogonal to each other, implying that there is no intra-cell interference. In 3GPP LTE, inter-cell interference can be a predominant factor limiting system performance especially for the client terminals located at cell edge areas. Inter-cell interference is caused as a result of collisions between RBs that are utilized by multiple adjacent cells simultaneously. When a client terminal moves away from the serving cell and becomes closer to a neighbor cell, the received signal quality may degrade as the received desired signal power may decrease and the received inter-cell interfering signal power may increase. In a multi-cell environment inter-cell interference can occur even when a client terminal is not in the cell edge areas. To handle large increase of data traffic in cellular wireless communication systems, cell density may be increased by adding more cells in a particular area but that in turn may result in increased inter-cell interference. In addition, introduction of Heterogeneous Networks (HetNet) with small cells inside macrocells using the same frequency, may increase inter-cell interference even further.

Multiple transmit and/or receive chains are commonly used in many wireless communication systems for different purposes. Using multiple transmit and/or receive chains, the spatial dimension can be exploited in the design of a wireless communication system. Wireless communication systems with multiple transmit and/or receive chains offer improved performance. Different techniques using multiple transmit and/or receive chains are often referred to with different terms such as Maximal Ratio Combining (MRC), Space-Time Coding (STC) or Space-Time Block Coding (STBC), Spatial Multiplexing (SM), Beam-Forming (BF) and Multiple Input Multiple Output (MIMO). Wireless communication systems with multiple transmit chains at the transmit entity and multiple receive chains at the receive entity are generically referred as MIMO systems. For client terminals in inter-cell interference scenarios, a Minimum Mean Square Error-Interference Rejection Combining (MMSE-IRC) receiver may be used to effectively improve the throughput performance.

The conventional MMSE receiver may process a received signal assuming that the statistical characteristics and the impact of interference from neighbor cells may be similar to that of noise received by a client terminal. Thus, in environments where the power level of the interference signal is higher than that of the noise, inter-cell interference may degrade the client terminal throughput. Using an MMSE-IRC receiver as a client terminal interference rejection and suppression technology to mitigate the effects of inter-cell interference, increases client terminal throughput even in scenarios where high interference is experienced by the client terminal. The MMSE-IRC receivers may be able to use multiple receiver antennas to create nulls in the arrival direction of an interference signal, by reducing the antenna gain which in turn may suppress the interfering signal, thereby improving the Signal to Interference and Noise Ratio (SINR) and throughput.

For achieving the throughput performance improvement, the MMSE-IRC receiver requires the knowledge of the statistics of the interference signals, such as a covariance matrix. A covariance matrix is a matrix whose diagonal components express the variance of each variable in a set of variables and each of the off-diagonal elements express the degree of correlation between two variables with respect to their direction of change. As the covariance matrix may not be known a priori, it may need to be estimated from the received signal. For example, the covariance matrix may be estimated from the composite signal which includes the interference signals and the desired signal. The covariance matrix estimation requires knowledge of propagation channel for the desired signal. This in turn makes the performance of MMSE-IRC receiver sensitive to the channel estimation errors as well as covariance matrix estimation errors.

Since a MMSE-IRC receiver is sensitive to covariance matrix estimation errors, by improving the accuracy of covariance matrix estimation, the throughput performance of the MMSE-IRC receiver may be significantly improved. In wireless communication systems, a client terminal may experience different types of fading conditions with different frequency selectivity. For example, in case of a 3GPP LTE wireless communication system, fading profiles such as Extended Pedestrian A (EPA), Extended Vehicular A model (EVA) and Extended Typical Urban model (ETU) are defined to address the different types of a propagation environment a client terminal may experience. Furthermore, a client terminal may experience different Signal-to-Noise Ratio (SNR) and SINR conditions. The throughput performance of the MMSE-IRC receiver may vary depending on the fading and geometry conditions. Here geometry is defined to be the same as that of the SINR. Specifically, the geometry factor G is defined as follows:

$$G = \frac{\text{Signal power of serving cell}}{\text{Interference power} + \text{Noise power}}$$

In 3GPP LTE wireless communication system, the signal conditions may vary depending on the number of client terminals in a cell, SINR at different client terminals, the location of all the active client terminals, etc.

SUMMARY

A method and apparatus are disclosed that increase the accuracy of covariance matrix estimation by adaptively determining the suitable bandwidth to be used for averaging as a function of the SINR and different fading conditions, which may in turn improve the throughput performance of an MMSE-IRC receiver.

In accordance with an aspect of the present disclosure, a method for receiving a signal at a client device in a wireless communication system may include controlling, by a processing device, performing Minimum Mean Square Error-Interference Rejection Combining (MMSE-IRC) processing of the signal based on an estimated covariance matrix, wherein the estimated covariance matrix is determined using reference signals (RS) from a serving base station averaged over a bandwidth length determined based on at least one of a fading profile or Signal-to-Noise (SNR) at the client device.

In one alternative, the bandwidth length may be inversely proportional to at least one of a variation characteristic of the fading profile or the SNR.

In one alternative, the method may further include controlling, by the processing device, estimating at least one of a delay spread of channel conditions at the client device to determine the fading profile or the SNR at the client device.

In one alternative, the delay spread of channel conditions and the SNR may be determined using respective predetermined quantization thresholds.

In one alternative, the wireless communication system may be a 3rd Generation Partnership Project (3GPP) Long Term Evolution (LTE) wireless communication system, and the bandwidth length may be equal to: one Resource Block (RB) when the fading profile is Extended Vehicular A model (EVA) or Extended Typical Urban model (ETU) and the SNR is greater than a predetermined SNR value, and four RBs when the fading profile is Extended Pedestrian A (EPA) and the SNR is less than the predetermined SNR value.

In one alternative, the predetermined SNR value may be 8 dB.

In one alternative, the bandwidth length maybe determined based on at least one of a measured worst case delay or Root Means Square (RMS) delay spread at the client device.

In one alternative, the wireless communication system may be a 3rd Generation Partnership Project (3GPP) Long Term Evolution (LTE) wireless communication system, and the bandwidth length may be equal to: eight Resource Blocks (RB) when the RMS delay spread is less than 50 ns, and six RBs when the RMS delay spread is at least 50 ns and less than 100 ns.

In one alternative, the RMS delay spread may be determined to correspond to a range of RMS delay spread among a plurality of different ranges of RMS delay spread.

In one alternative the bandwidth length may be inversely proportional to the RMS delay spread.

In one alternative, the bandwidth length may be determined from a look-up table stored in a memory, and the look-up table may be indexed by estimated values of quantized RMS delay spread according to first RMS delay spread thresholds and estimated values of quantized SNR according to second SNR thresholds.

In one alternative, the method may include controlling, by the processing device, determining the bandwidth length according to a predetermined rate.

In one alternative, the predetermined rate may be based on an estimated Doppler spread at the client device.

In accordance with an aspect of the present disclosure, an apparatus for receiving a signal at a client device in a wireless communication system may include circuitry configured to control performing Minimum Mean Square Error-Interference Rejection Combining (MMSE-IRC) processing of the signal based on an estimated covariance matrix, wherein the estimated covariance matrix is determined using reference signals (RS) from a serving base station averaged over a bandwidth length determined based on at least one of a fading profile or Signal-to-Noise (SNR) at the client device.

In one alternative of the apparatus, the bandwidth length may be inversely proportional to at least one of a variation characteristic of the fading profile or the SNR.

In one alternative of the apparatus, the circuitry may be configured to control estimating at least one of a delay spread of channel conditions at the client device to determine the fading profile or the SNR at the client device.

In one alternative of the apparatus, the wireless communication system may be a 3rd Generation Partnership Project (3GPP) Long Term Evolution (LTE) wireless communication system, and the bandwidth length may be equal to: one Resource Block (RB) when the fading profile is Extended Vehicular A model (EVA) or Extended Typical Urban model (ETU) and the SNR is greater than a predetermined SNR value, and four RBs when the fading profile is Extended Pedestrian A (EPA) and the SNR is less than the predetermined SNR value.

In one alternative of the apparatus, the bandwidth length may be determined based on at least one of a measured worst case delay or Root Means Square (RMS) delay spread at the client device.

In one alternative of the apparatus, the circuitry may be configured to control determining the bandwidth length according to a predetermined rate.

In accordance with an aspect of the present disclosure, a wireless communication device may include a receiver to receive a signal of a wireless communication system; and a processing device configured to control performing Minimum Mean Square Error-Interference Rejection Combining (MMSE-IRC) processing of the signal based on an estimated covariance matrix, wherein the estimated covariance matrix is determined using reference signals (RS) from a serving base station averaged over a bandwidth length determined based on at least one of a fading profile or Signal-to-Noise (SNR) at the client device.

BRIEF DESCRIPTION OF THE DRAWINGS

FIG. 19 illustrates a Radio Frequency (RF) subsystem for a wireless mobile station, which may be employed with aspects of the disclosure described herein.

DETAILED DESCRIPTION

Figure 1:
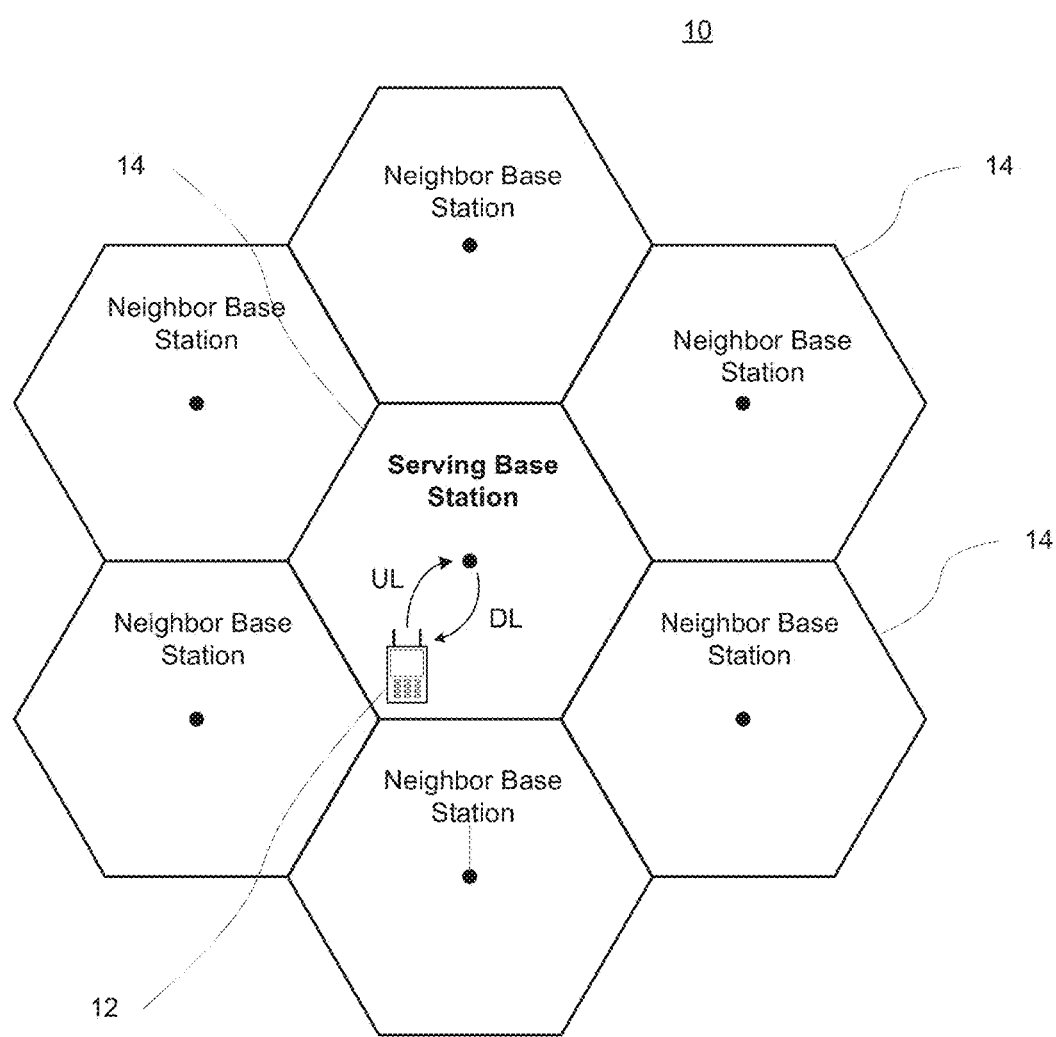
FIG. 1 illustrates a conventional wireless cellular communication system.
Figure 2:
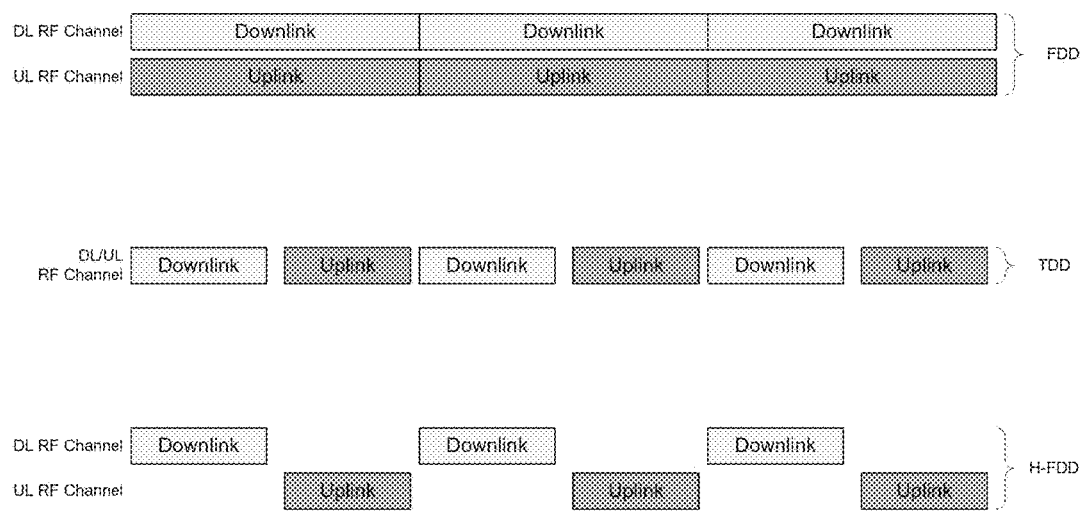
FIG. 2 illustrates FDD, TDD and H-FDD duplexing techniques.
Figure 3:
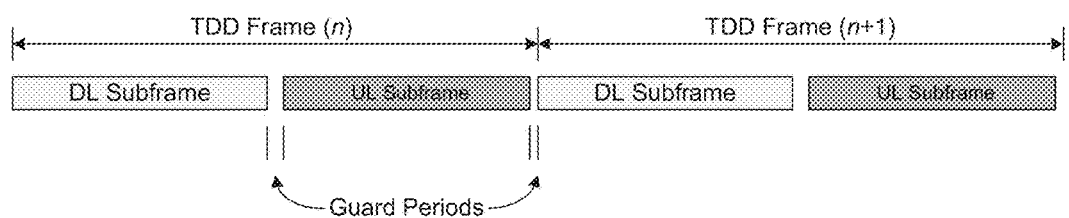
FIG. 3 illustrates a TDD frame consisting of DL portions and UL portions.
Figure 4:
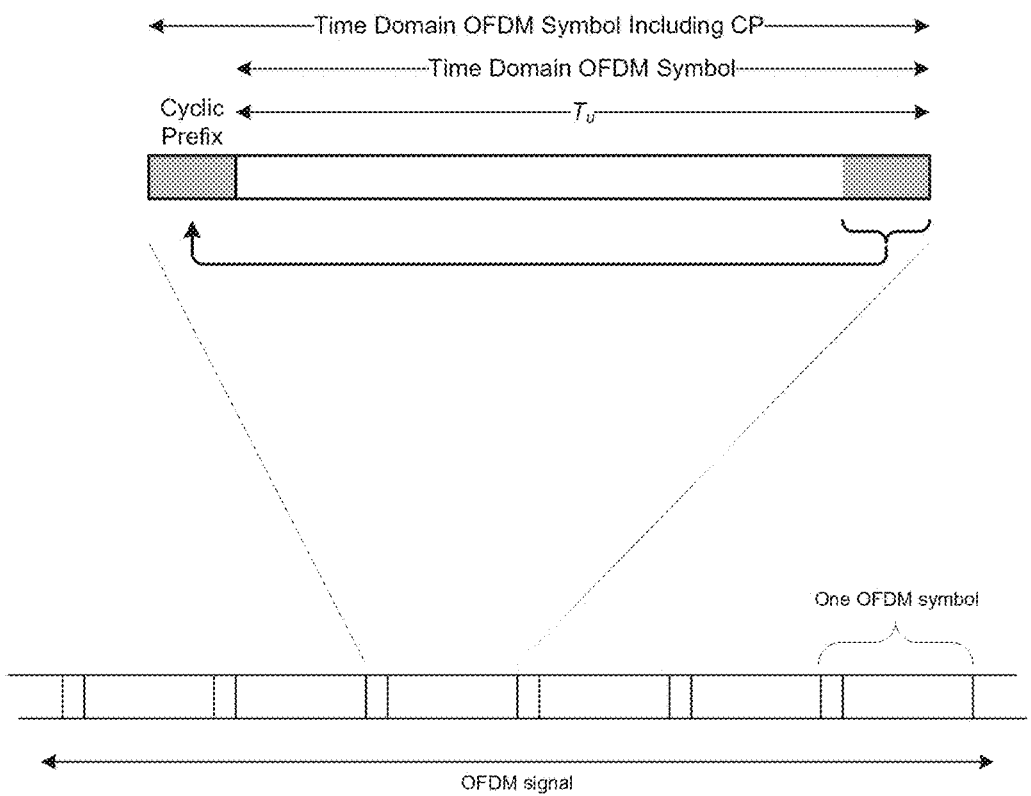
FIG. 4 illustrates an OFDM symbol with Cyclic Prefix Insertion.
Figure 5:
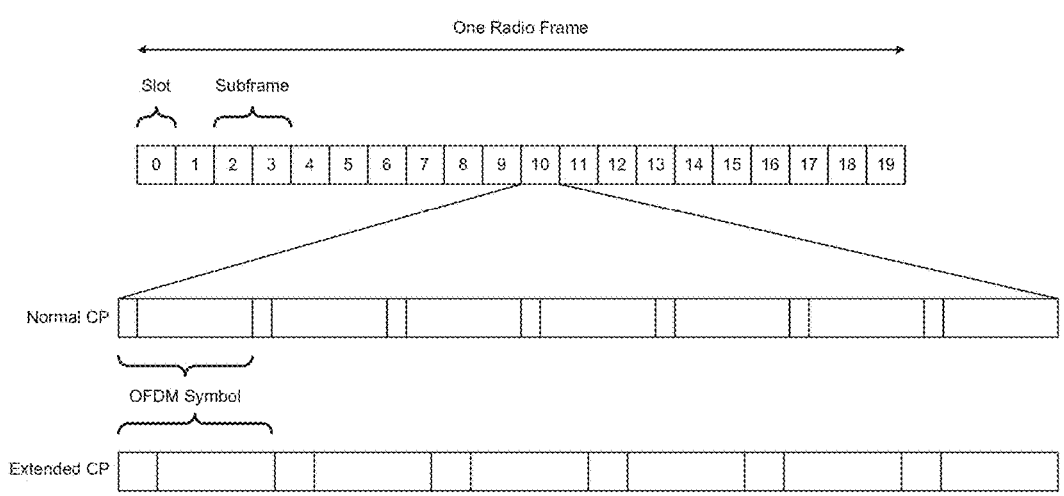
FIG. 5 illustrates the frame structure of the air interface of the 3GPP LTE wireless communication system.

The foregoing aspects, features and advantages of the present disclosure will be further appreciated when considered with reference to the following description of preferred embodiments and accompanying drawings, wherein like reference numerals represent like elements. In describing the preferred embodiments of the disclosure illustrated in the appended drawings, specific terminology will be used for the sake of clarity. However, the disclosure is not intended to be limited to the specific terms used.

The MMSE receivers treat interference included in the received signal as noise and combine the signals received at the receive antennas as expressed below:

Let $\hat{d}$ be the recovered signal at the client terminal and $w_{opt}$ be the optimum receiver weight matrix. The optimum receiver matrix reflects the fluctuations in amplitude and phase, and is used to combine or separate signals received at multiple receive antennas. Then the received signal y is combined as follows, $$\hat{d} = w_{opt}^* y \quad (1)$$

The optimum receiver weight matrix is defined as follows, $$w_{opt} = P_1 H_1^H R^{-1} \quad (2)$$

Here, $P_1$ is the transmit power of serving cell and $H_1$ refers to the channel matrix between the serving cell and the client terminal. Channel matrix is composed of changes in amplitude and phase on the channels between each transmit and receive antenna pair. R is the covariance matrix that has interference signal component combined with noise as follows, $$R = P_1 H_1 H_1^H + \sigma^2 * I \quad (3)$$

Here, $\sigma^2$ is the noise power and I is the identity matrix. Since interference signals are handled as equivalent to noise, the arrival direction of the noise is ignored.

The MMSE-IRC receivers consider interference signals independent of noise components as follows.

The covariance matrix R in EQ. (2) is defined as follows for MMSE-IRC receivers, $$R = P_1 H_1 H_1^H + \sum_i P_i H_i H_i^H + \sigma^2 * I \quad (4)$$

Here, $H_i$ (i>1) refers to the channel matrix between $i^{th}$ neighbor cell and client terminal. $P_i$ is the transmit power of neighbor cell. $H_i H_i^H$ represents the degree of correlation in the interfering signal from $i^{th}$ cell. By taking the inverse matrix of the covariance matrix of EQ. (4) in the receiver weight matrix, the coefficients corresponding to the main interference signal are reduced. The interfering signal is suppressed by orienting a null in the direction of its arrival, i.e., the antenna gain is made very small in that direction. Due to suppression of interference signals, SINR is increased and throughput achieved in MMSE-IRC receiver may be higher than MMSE receiver.

In an MMSE-IRC receiver, the estimation of covariance matrix comprising of interference and noise power is of prime importance as it plays a crucial role in suppressing the interfering signals. Covariance matrix estimation may be done using the serving cell reference signals (RS). In order to reduce the covariance matrix error, estimation is performed through time and frequency domain averaging of the samples considering the period over which the channel variations are minimal.

Performance improvement may be achieved by frequency domain averaging in covariance matrix estimation. Ideally, increasing averaging may result in improved estimation accuracy. But this averaging period is limited by the channel variation in frequency domain. The bandwidth over which the frequency domain averaging is done is termed herein as sub-band length which may be defined in terms of number of RB's.

The channel variation characteristics in frequency domain differ for different fading profiles defined in 3GPP LTE wireless communication systems in accordance with the channel coherence bandwidth. So using a fixed sub-band length for frequency domain averaging in covariance matrix estimation for all fading profiles may not be considered as efficient from performance perspective. Though employing a fixed sub-band length can be optimum for some fading profiles, it doesn't utilize the full potential of averaging for other fading profiles. Thereby, there may be still room for performance improvement for those fading profiles which are affected by using a fixed sub-band length for frequency domain averaging. To address this problem, a dynamic way of selecting the optimum sub-band length for frequency domain averaging is devised based on the delay spread experienced by a client terminal.

According to an aspect of the present disclosure, depending on the nature of the fading profile and prevailing SNR, different sub-band length may be used. According to an aspect of the present disclosure, higher sub-band length may be used for slow varying fading profiles, while lower sub-band length may be used for fast fading profiles at higher SNR. The steps for the proposed solution for making full utilization of frequency domain averaging of covariance matrix estimation is as follows:

a) Estimate the delay spread and SNR based on the environment conditions experienced by a client terminal.

b) Based on the estimated delay spread and SNR, determine the sub-band length to be used for frequency domain averaging of covariance matrix estimation.

Figure 6:
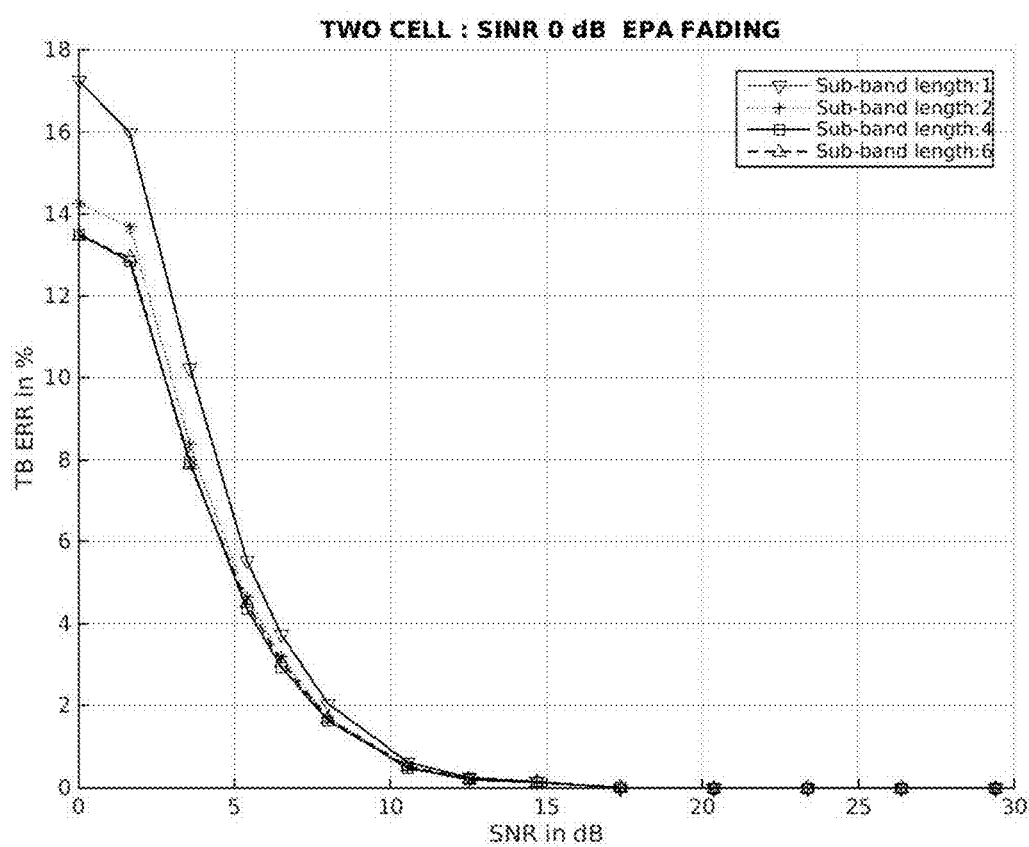
FIG. 6 illustrates the block error rate performance of MMSE-IRC receiver performing under the geometry of 0 dB with EPA fading profile for different bandwidth (1 RB, 2 RB, 4 RB and 6 RB) used for covariance matrix estimation according to the aspects of the present disclosure.
Figure 7:
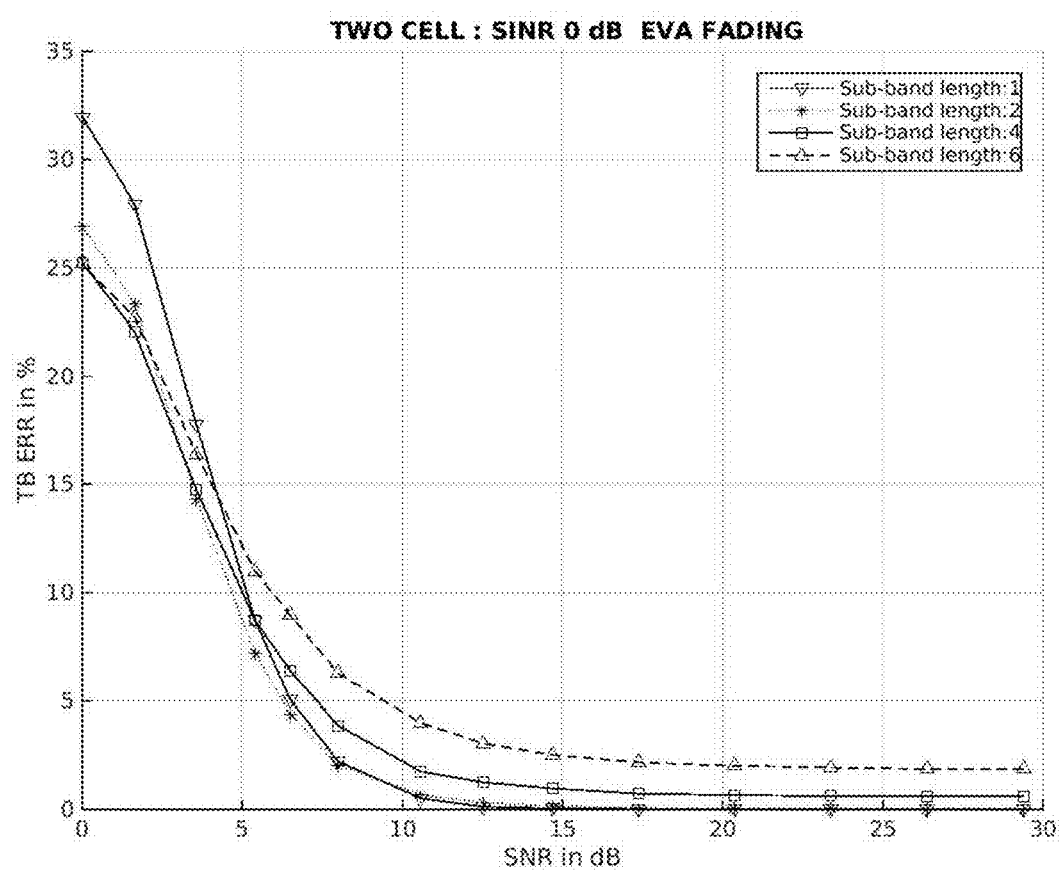
FIG. 7 illustrates the block error rate performance of MMSE-IRC receiver performing under the geometry of 0 dB with EVA fading profile for different bandwidth (1 RB, 2 RB, 4 RB and 6 RB) used for covariance matrix estimation according to the aspects of the present disclosure.
Figure 8:
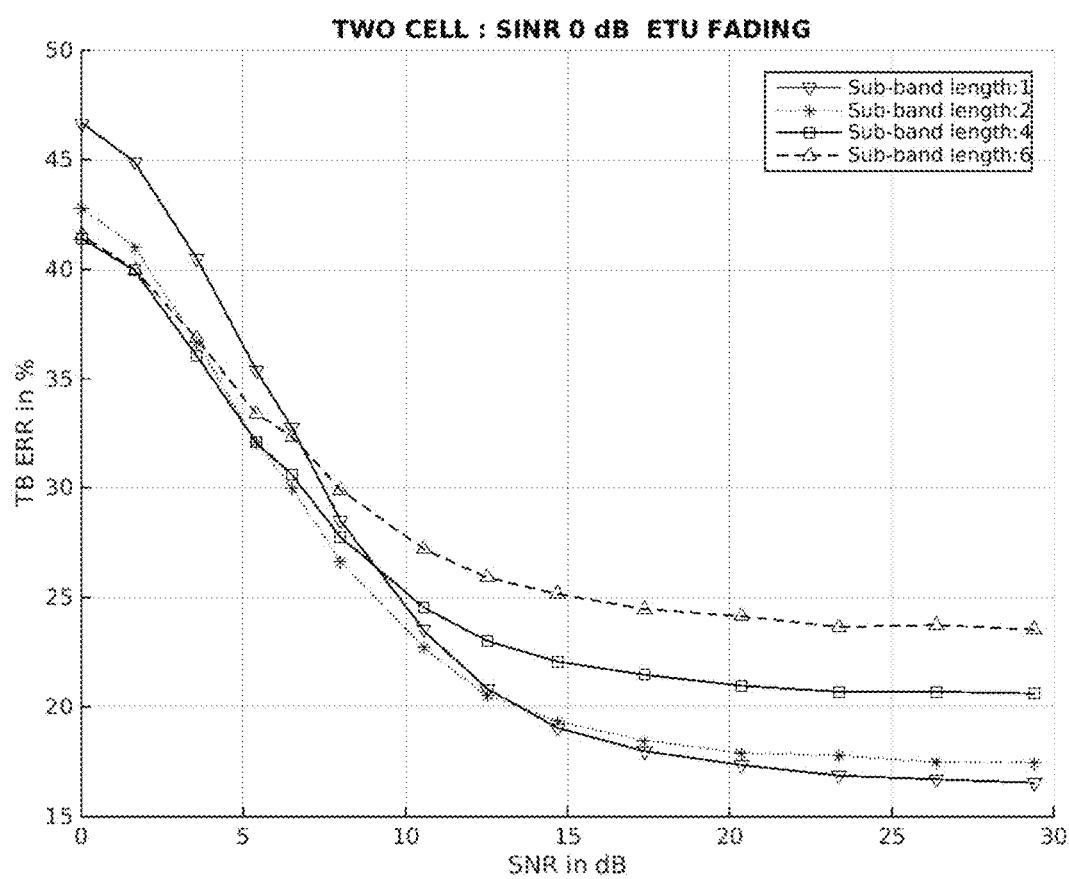
FIG. 8 illustrates the block error rate performance of MMSE-IRC receiver performing under the geometry of 0 dB with ETU fading profile for different bandwidth (1 RB, 2 RB, 4 RB and 6 RB) used for covariance matrix estimation according to the aspects of the present disclosure.

FIG. 6, FIG. 7 and FIG. 8 compare the block error rate performance observed in MMSE-IRC receiver for different bandwidth used for covariance matrix averaging under 0 dB geometry for EPA, EVA and ETU fading profiles respectively. The simulation setup and environment conditions are as defined for link-level simulation in 3GPP Technical Report 36.829. The graphs show transport block error rate (TB ERR) in vertical axis and SNR experienced by client terminal in horizontal axis.

In FIG. 6, optimum TB ERR performance is achieved by using increased bandwidth. For example, use of 4 RB or 6 RB for covariance matrix estimation is superior to the use of reduced bandwidth of 2 RB or 1 RB for covariance matrix averaging for slow fading profile such as EPA. In FIG. 7 and FIG. 8, corresponding to EVA and ETU respectively, using reduced bandwidth for averaging at higher SNR is optimum since the fading profiles under consideration are fast varying. At lower SNR, due to dominance of noise, increased averaging may be preferred and the same is observed in the block error rate performance in FIG. 7 and FIG. 8.

Figure 9:
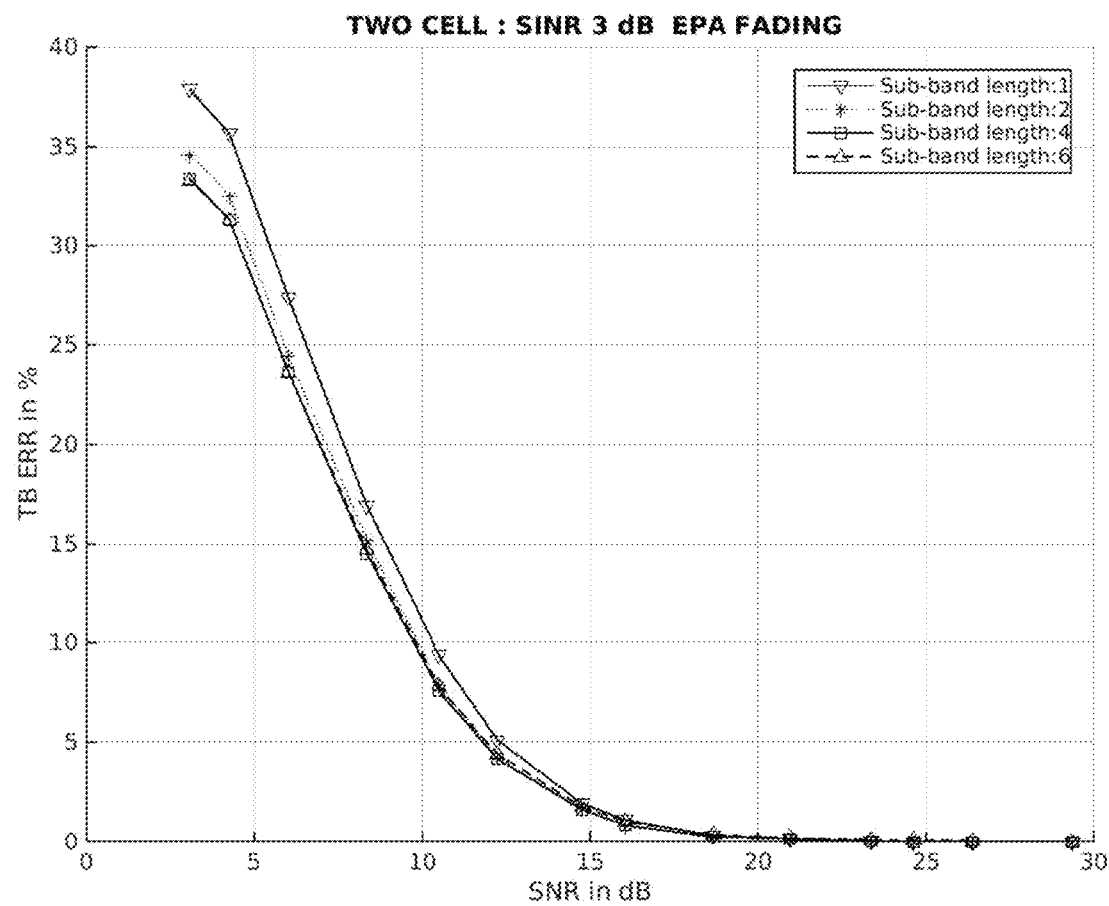
FIG. 9 illustrates the block error rate performance of MMSE-IRC receiver performing under the geometry of 3 dB with EPA fading profile for different bandwidth (1 RB, 2 RB, 4 RB and 6 RB) used for covariance matrix estimation according to the aspects of the present disclosure.
Figure 10:
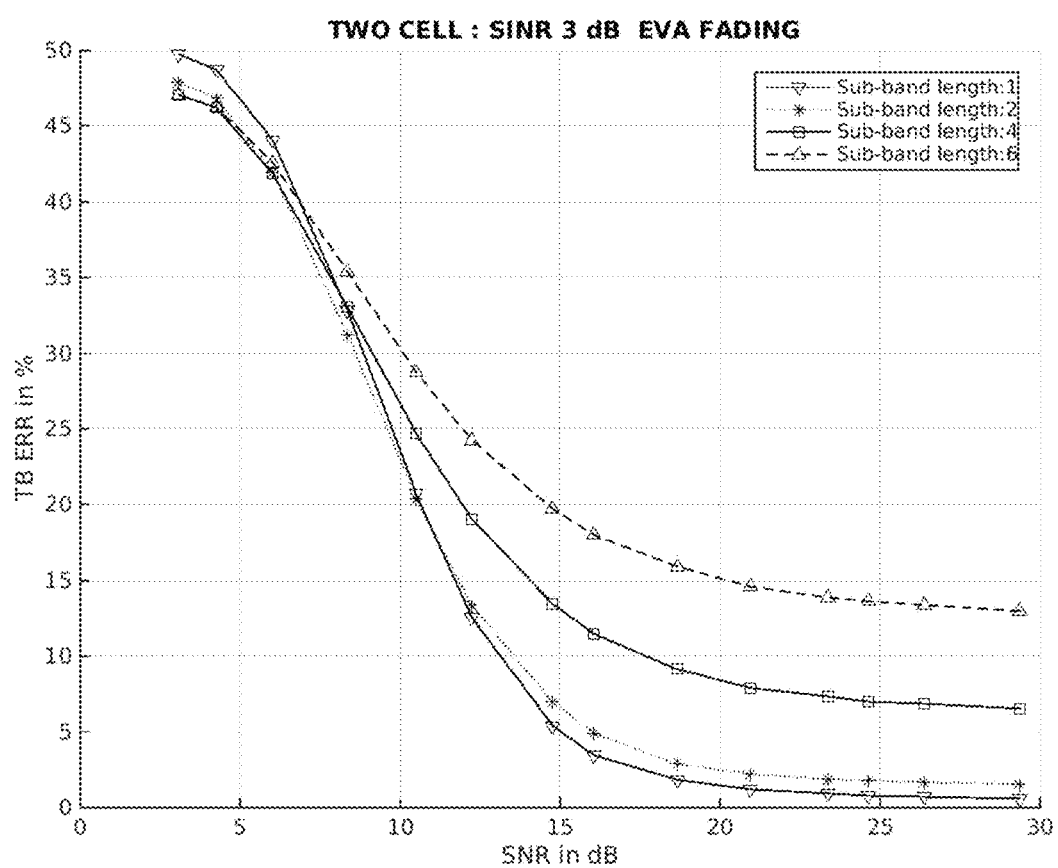
FIG. 10 illustrates the block error rate performance of MMSE-IRC receiver performing under the geometry of 3 dB with EVA fading profile for different bandwidth (1 RB, 2 RB, 4 RB and 6 RB) used for covariance matrix estimation according to the aspects of the present disclosure.
Figure 11:
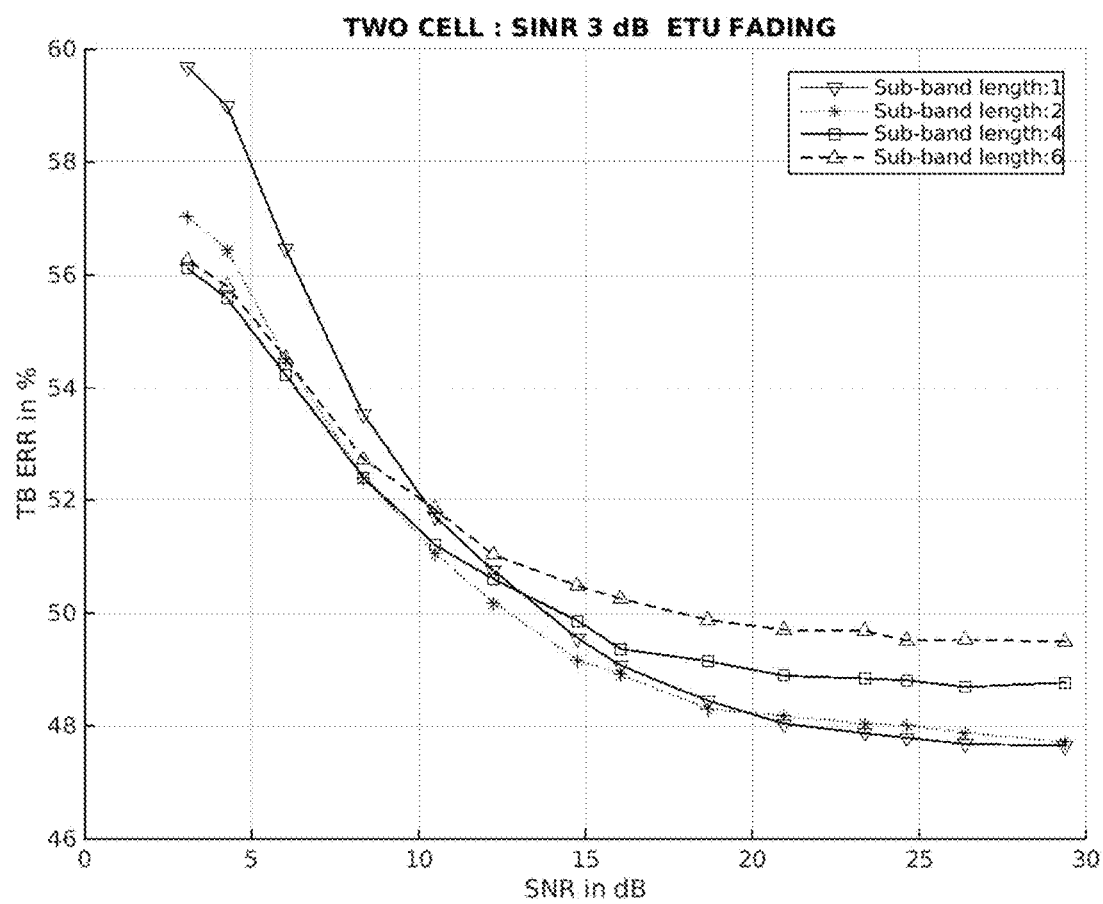
FIG. 11 illustrates the block error rate performance of MMSE-IRC receiver performing under the geometry of 3 dB with ETU fading profile for different bandwidth (1 RB, 2 RB, 4 RB and 6 RB) used for covariance matrix estimation according to the aspects of the present disclosure.
Figure 12:
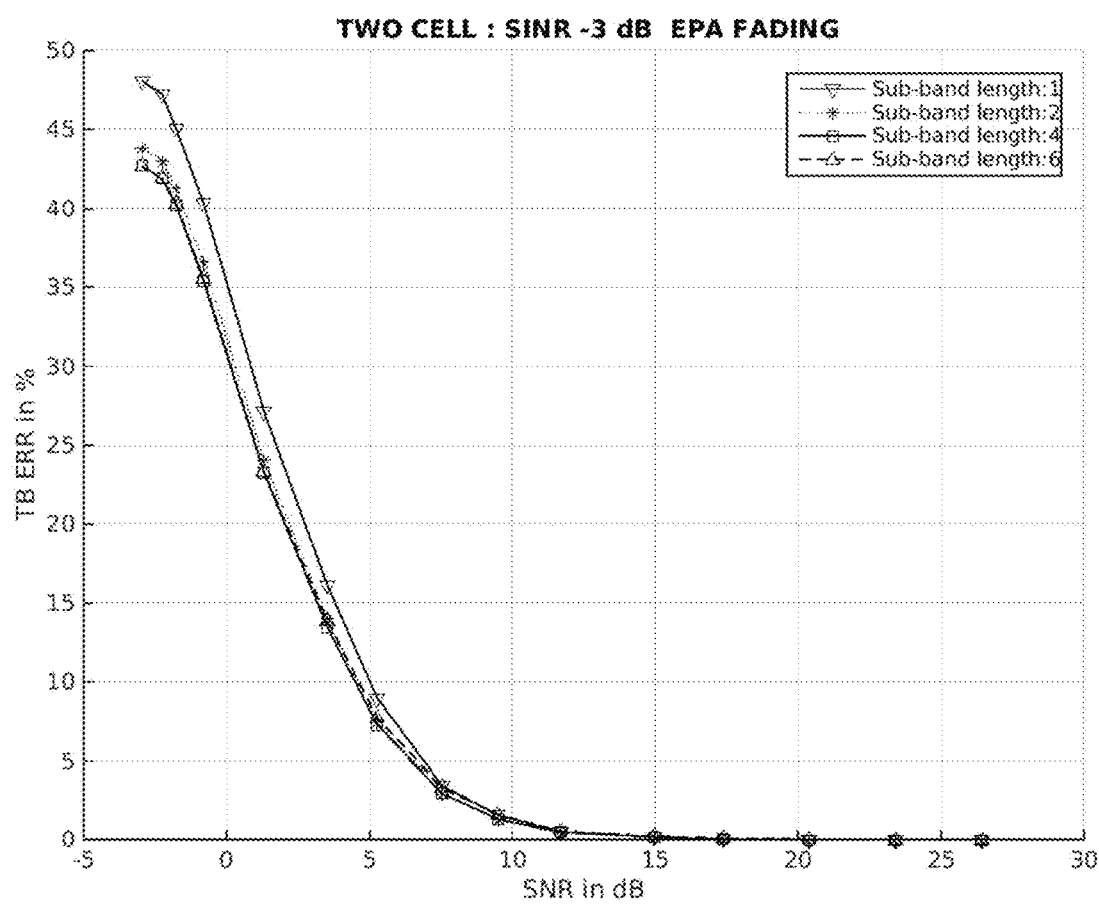
FIG. 12 illustrates the block error rate performance of MMSE-IRC receiver performing under the geometry of −3 dB with EPA fading profile for different bandwidth (1 RB, 2 RB, 4 RB and 6 RB) used for covariance matrix estimation according to the aspects of the present disclosure.
Figure 13:
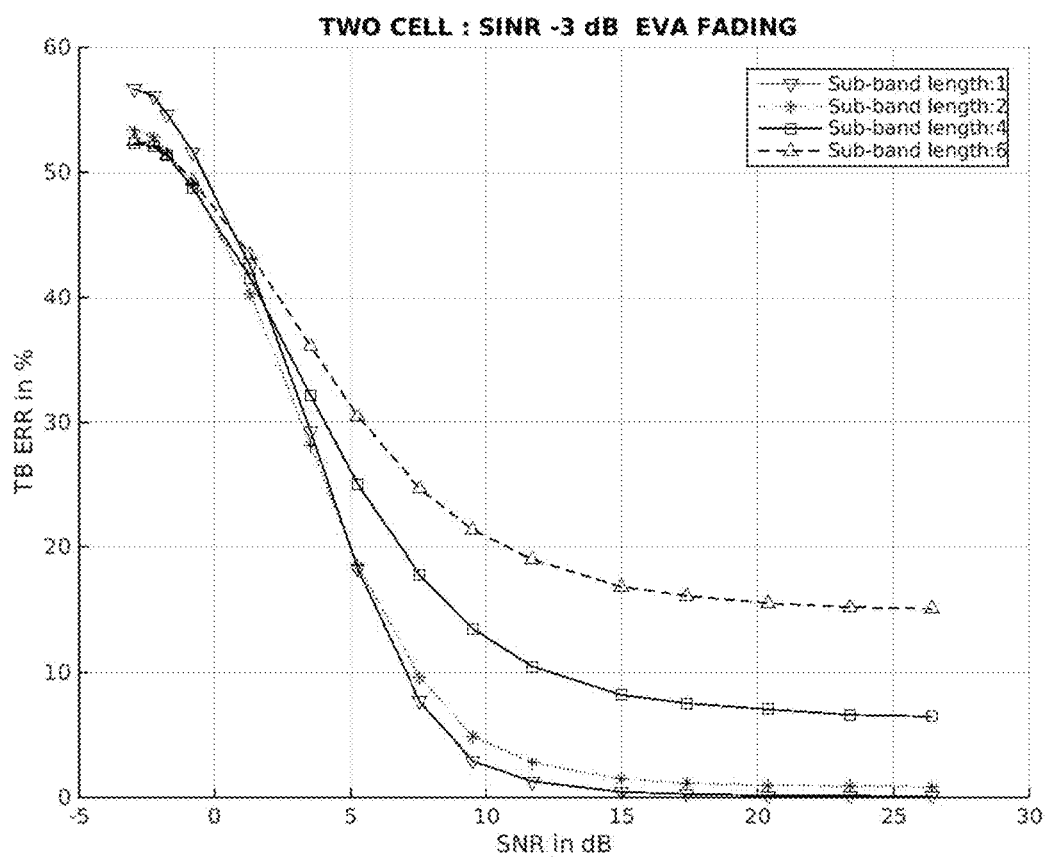
FIG. 13 illustrates the block error rate performance of MMSE-IRC receiver performing under the geometry of −3 dB with EVA fading profile for different bandwidth (1 RB, 2 RB, 4 RB and 6 RB) used for covariance matrix estimation according to the aspects of the present disclosure.
Figure 14:
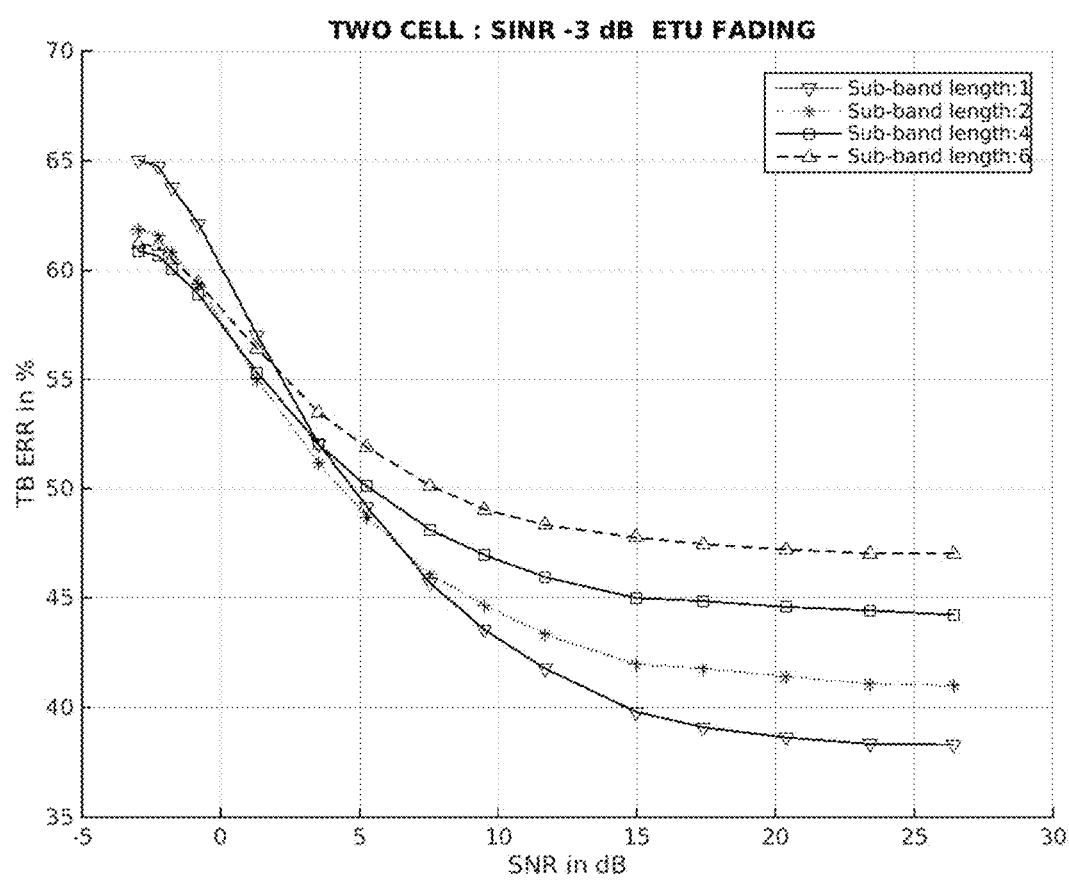
FIG. 14 illustrates the block error rate performance of MMSE-IRC receiver performing under the geometry of −3 dB with ETU fading profile for different bandwidth (1 RB, 2 RB, 4 RB and 6 RB) used for covariance matrix estimation according to the aspects of the present disclosure.

Similarly FIG. 9, FIG. 10 and FIG. 11 illustrate the block error rate performance under geometry conditions of 3 dB. FIG. 12, FIG. 13 and FIG. 14 illustrate the block error rate performance under geometry conditions of −3 dB. The behavior in both these geometries is observed to be similar as in geometry of 0 dB.

According to an aspect of the present disclosure, sub-band length of one RB may be used for fast fading profiles such as EVA and ETU at higher SNR, for example, above 8 dB, and a sub-band length of four RBs may be used across the SNR range for slow fading profiles such as EPA and at SNR, for example, lower than 8 dB for EVA and ETU fading profiles. According to an aspect of the present disclosure, the estimated SNR may be partitioned into multiple ranges using multiple thresholds. The selection of the sub-band length for different SNR ranges may be different. In general, lower bandwidth (sub-band length) may be used for higher SNR scenarios and wider bandwidth (sub-band length) may be used for lower SNR scenarios.

According to an aspect of the present disclosure, the sub-band length for different fading profiles and the SNR threshold may be configurable. The fading profile models such as EPA, EVA, and ETU specified in 3GPP LTE wireless communication system specifications are only a subset of conditions that may be experienced by a client terminal. According to an aspect of the present disclosure, the sub-band length for averaging of the covariance matrix may be done according to the measured worst case delay or Root Mean Square (RMS) delay spread. For example, if the RMS delay spread is less than 50 ns, sub-band length of eight RB may be used, if the RMS delay spread is at least 50 ns and less than 100 ns, sub-band length of six RB may be used, and so on. According to an aspect of the present disclosure, the estimated RMS delay spread may be partitioned into multiple ranges using multiple thresholds. The selection of the sub-band length for different RMS delay spread ranges may be different. In general, lower bandwidth (sub-band length) may be used for higher RMS delay spread scenarios and wider bandwidth (sub-band length) may be used for lower RMS delay spread scenarios. According to an aspect of the present disclosure, the selection of the sub-band length for covariance estimation may be done by combination of the estimated SNR and estimated delay spread. For example, a two-dimensional look-up table may be prepared and indexed by estimated quantized RMS delay spread as per the thresholds and estimated quantized SNR as per the thresholds.

Figure 15:
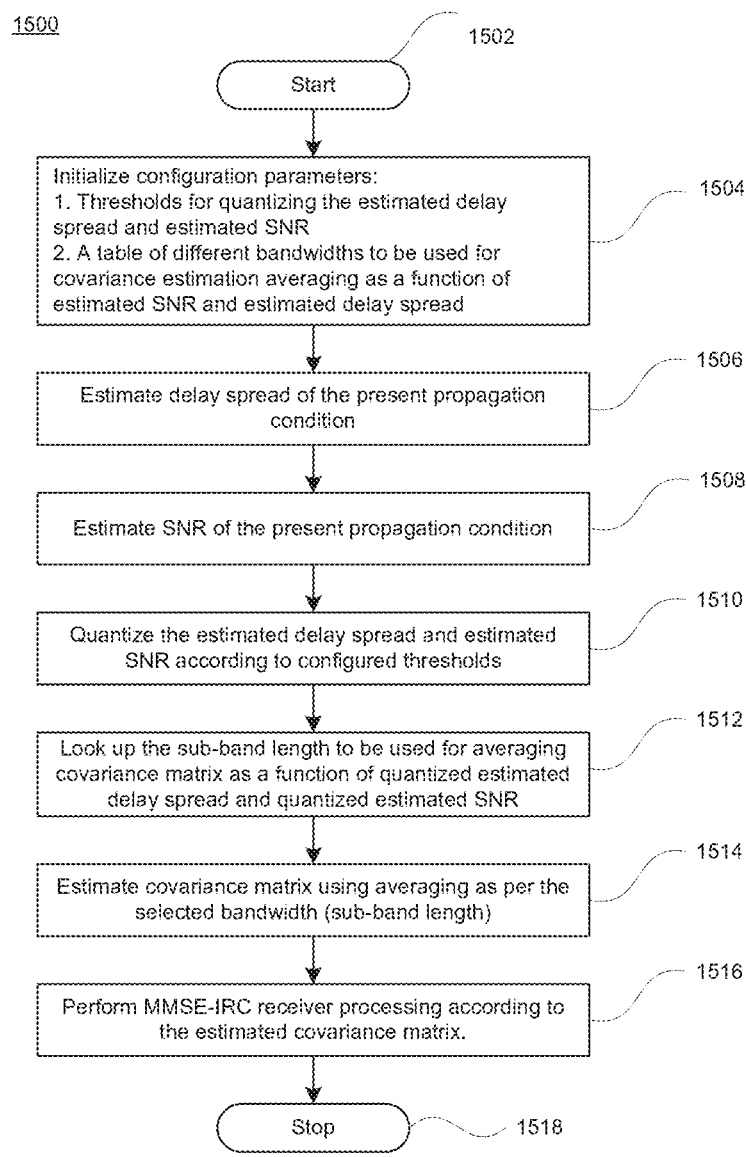
FIG. 15 illustrates the aspects of the present disclosure in the form of flow diagram.

Aspects of the present disclosure are illustrated in the flow diagram 1500 contained in FIG. 15. The processing relevant to the present disclosure begins at processing stage 1504 where the parameters required for the operation of the disclosed method may be initialized. The parameters may include a set of thresholds to be used for quantizing the estimated SNR and the estimated delay spread, a table of different sub-band lengths (bandwidths) to be used as a function of quantized estimated SNR and quantized estimated delay spread. At processing stage 1506, the delay spread of the prevailing channel conditions may be estimated. The estimated delay spread may be expressed in specific representations such as RMS Delay Spread. At processing stage 1508, the SNR of the prevailing channel conditions may be estimated. The estimated SNR may be expressed in specific representations such as dB. At processing stage 1510, the estimated delay spread and the estimated SNR may be quantized using the configured thresholds. At processing stage 1512, the quantized delay spread and quantized estimated SNR may be used to look up the configured table for sub-band length (bandwidth) to be used for averaging in covariance estimation. At processing stage 1514, the covariance may be estimated and averaged according to the sub-band length (bandwidth) determined in processing stage 1512. At processing stage 1516, the MMSE-IRC receiver processing may be performed using the estimated covariance matrix. All the processing steps in the flow diagram of FIG. 15, except for the initialization in processing stage 1504, may be repeated for each basic time unit, such as a sub-frame in case of 3GPP LTE wireless communication system. For a different wireless communication system, the processing steps may be repeated for each of its basic time unit of the air-interface structure. According to an aspect of the present disclosure, the update of the sub-band length (bandwidth) for averaging in covariance estimation may be performed at different rate. According to an aspect of the present disclosure, the rate of update may be a function of the estimated Doppler spread which is indicative of how fast the propagation channel may be varying over time. Although the disclosed method is illustrated for the 3GPP LTE wireless communication system, it may be applicable to any wireless communication system where MMSE-IRC receiver may be used. The disclosed method may be applicable to base stations or client terminals.

Figure 16:
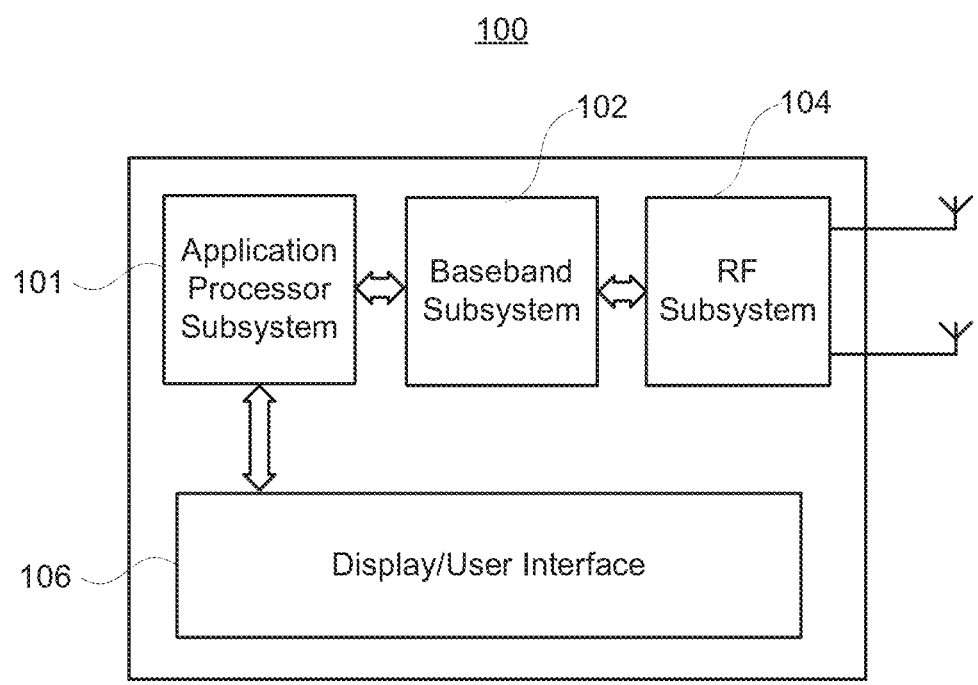
FIG. 16 illustrates a wireless mobile station diagram, which may be employed with aspects of the disclosure described herein.

By way of example only, the above-described method may be implemented in a receiver, e.g., a user device such as a wireless mobile station (MS) 100 as shown in FIG. 16.

As shown in FIG. 16, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 17:
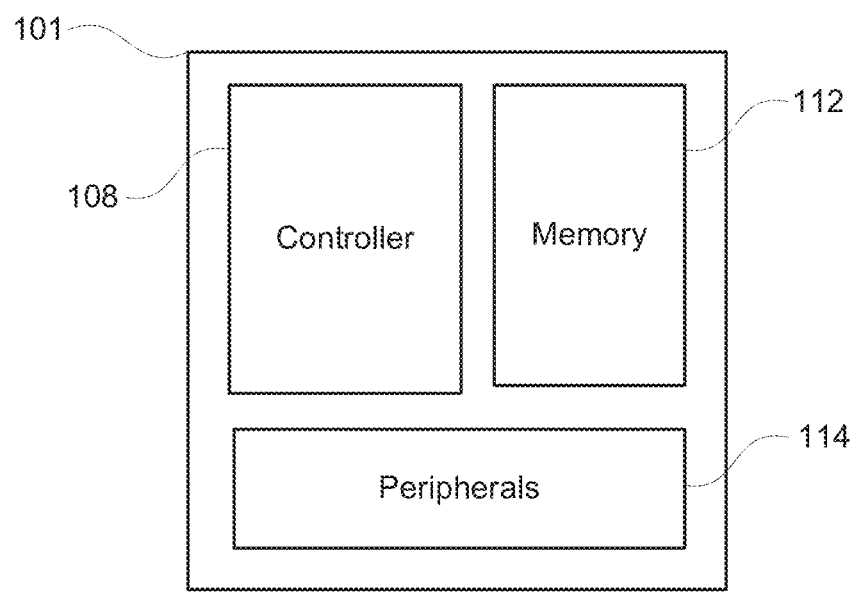
FIG. 17 illustrates an application processor subsystem for a wireless mobile station, which may be employed with aspects of the disclosure described herein.
Figure 18:
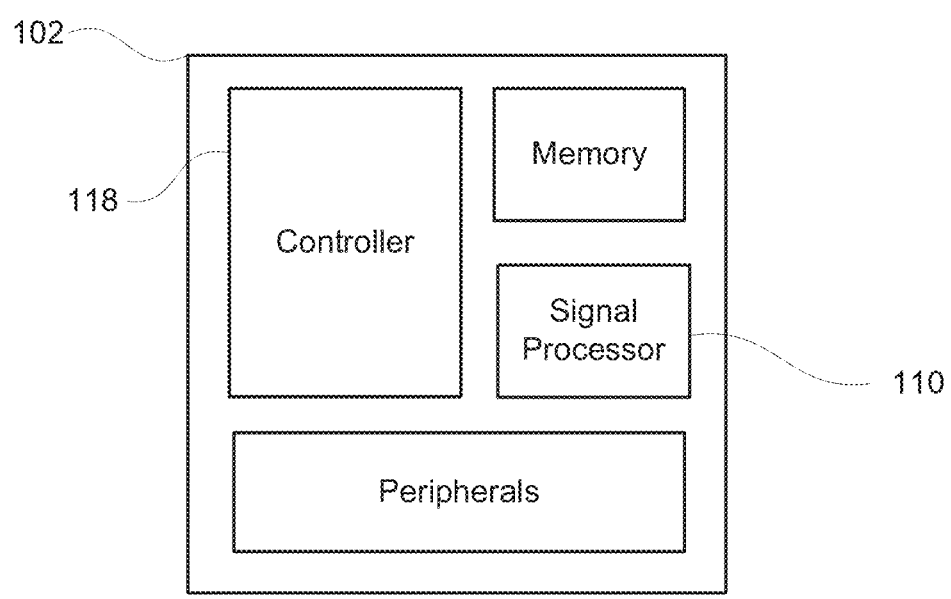
FIG. 18 illustrates a baseband subsystem for a wireless mobile station, which may be employed with aspects of the disclosure described herein.

The application processor subsystem 101 as shown in FIG. 17 may include a controller 108 such as a microcontroller, another processor or other circuitry. The baseband subsystem 102 as shown in FIG. 18 may include a controller 118 such as a microcontroller or other processor. The RF subsystem 104 as shown in FIG. 19 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

Peripherals 114 such as a full or partial keyboard, video or still image display, audio interface, etc may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 18 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use this disclosure may include smartphones, tablets, laptops, gaming consoles, cameras, video camcorders, TV, car entertainment systems, etc.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for receiving a signal at a client device in a wireless communication system, the method comprising:
   controlling, by a processing device, performing Minimum Mean Square Error-Interference Rejection Combining (MMSE-IRC) processing of the signal based on an estimated covariance matrix,
   wherein the estimated covariance matrix is determined using reference signals (RS) from a serving base station averaged over a bandwidth length determined based on at least one of a fading profile or Signal-to-Noise (SNR) at the client device.

2. The method of claim 1, wherein the bandwidth length is inversely proportional to at least one of a variation characteristic of the fading profile or the SNR.

3. The method of claim 1, further comprising:
   controlling, by the processing device, estimating at least one of a delay spread of channel conditions at the client device to determine the fading profile or the SNR at the client device.

4. The method of claim 3, wherein the delay spread of channel conditions and the SNR are determined using respective predetermined quantization thresholds.

5. The method of claim 1,
   wherein the wireless communication system is a 3rd Generation Partnership Project (3GPP) Long Term Evolution (LTE) wireless communication system, and wherein the bandwidth length is equal to:
      one Resource Block (RB) when the fading profile is Extended Vehicular A model (EVA) or Extended Typical Urban model (ETU) and the SNR is greater than a predetermined SNR value, and
      four RBs when the fading profile is Extended Pedestrian A (EPA) and the SNR is less than the predetermined SNR value.

6. The method of claim 5, wherein the predetermined SNR value is 8 dB.

7. The method of claim 1, wherein the bandwidth length is determined based on at least one of a measured worst case delay or Root Means Square (RMS) delay spread at the client device.

8. The method claim 7,
   wherein the wireless communication system is a 3rd Generation Partnership Project (3GPP) Long Term Evolution (LTE) wireless communication system, and wherein the bandwidth length is equal to:
      eight Resource Blocks (RB) when the RMS delay spread is less than 50 ns, and
      six RBs when the RMS delay spread is at least 50 ns and less than 100 ns.

9. The method of claim 7, wherein the RMS delay spread is determined to correspond to a range of RMS delay spread among a plurality of different ranges of RMS delay spread.

10. The method of claim 7, wherein the bandwidth length is inversely proportional to the RMS delay spread.

11. The method of claim 7,
    wherein the bandwidth length is determined from a look-up table stored in a memory, and
    wherein the look-up table is indexed by estimated values of quantized RMS delay spread according to first RMS delay spread thresholds and estimated values of quantized SNR according to second SNR thresholds.

12. The method of claim 1, further comprising:
    controlling, by the processing device, determining the bandwidth length according to a predetermined rate.

13. The method of claim 12, wherein the predetermined rate is based on an estimated Doppler spread at the client device.

14. An apparatus for receiving a signal at a client device in a wireless communication system, the apparatus comprising:
    circuitry configured to control performing Minimum Mean Square Error-Interference Rejection Combining (MMSE-IRC) processing of the signal based on an estimated covariance matrix,
    wherein the estimated covariance matrix is determined using reference signals (RS) from a serving base station averaged over a bandwidth length determined based on at least one of a fading profile or Signal-to-Noise (SNR) at the client device.

15. The apparatus of claim 14, wherein the bandwidth length is inversely proportional to at least one of a variation characteristic of the fading profile or the SNR.

16. The apparatus of claim 14,
    wherein the circuitry is configured to control estimating at least one of a delay spread of channel conditions at the client device to determine the fading profile or the SNR at the client device.

17. The apparatus of claim 14,
    wherein the wireless communication system is a 3rd Generation Partnership Project (3GPP) Long Term Evolution (LTE) wireless communication system, and wherein the bandwidth length is equal to:
       one Resource Block (RB) when the fading profile is Extended Vehicular A model (EVA) or Extended Typical Urban model (ETU) and the SNR is greater than a predetermined SNR value, and four RBs when the fading profile is Extended Pedestrian A (EPA) and the SNR is less than the predetermined SNR value.

18. The apparatus of claim 14, wherein the bandwidth length is determined based on at least one of a measured worst case delay or Root Means Square (RMS) delay spread at the client device.

19. The apparatus of claim 14, wherein the circuitry is configured to control determining the bandwidth length according to a predetermined rate.

20. A wireless communication device comprising:
- a receiver to receive a signal of a wireless communication system; and
- a processing device configured to control performing Minimum Mean Square Error-Interference Rejection Combining (MMSE-IRC) processing of the signal based on an estimated covariance matrix,
- wherein the estimated covariance matrix is determined using reference signals (RS) from a serving base station averaged over a bandwidth length determined based on at least one of a fading profile or Signal-to-Noise (SNR) at the client device.

* * * * *